United States Patent [19]
Hansen

[11] Patent Number: 5,528,830
[45] Date of Patent: Jun. 25, 1996

[54] ROTARY CUTTING TOOL FOR TUBING, CONDUIT AND THE LIKE

[76] Inventor: Fredrick M. Hansen, 40102 N. Circle Ave., Antioch, Ill. 60002

[21] Appl. No.: 198,629

[22] Filed: Feb. 18, 1994

[51] Int. Cl.⁶ .............................. B26D 3/16; B23B 5/14
[52] U.S. Cl. .............................. 30/97; 30/101; 30/102; 82/63
[58] Field of Search .............................. 30/90.3, 97, 102, 30/108, 101; 82/63

[56] References Cited

U.S. PATENT DOCUMENTS

| | | |
|---|---|---|
| 1,306,588 | 6/1919 | France . |
| 2,112,396 | 3/1938 | Corrigan . |
| 2,448,578 | 9/1948 | Condon . |
| 2,753,744 | 7/1956 | Therien . |
| 3,129,621 | 4/1964 | Makowski . |
| 3,651,569 | 3/1972 | Arnot . |
| 3,715,940 | 2/1973 | Davis . |
| 3,739,666 | 6/1973 | Wright et al. . |
| 3,942,248 | 3/1976 | Sherer et al. ............... 30/198 X |
| 4,566,358 | 1/1986 | Ducanis ..................... 82/63 X |
| 4,769,911 | 9/1988 | Araki . |
| 4,802,278 | 2/1989 | Vanderpol et al. . |
| 5,206,996 | 5/1993 | McDaniel . |

Primary Examiner—Rinaldi I. Rada
Attorney, Agent, or Firm—Lockwood, Alex, Fitzgibbon & Cummings

[57] ABSTRACT

A tool for cutting tubular members has a rotatable cutting assembly adapted for mounting on the end of a tool body. The cutting assembly includes a rotatable base member having two support elements which support two cutting heads on the base member. The support elements are each pivotally mounted on the base member such that rotation of the base member causes each support element to pivot around an independent axis. Each support element has one or more weights located on one side of the axis and a cutting head located on the other side of the axis. Centrifugal force developed during rotation of the base member cause the weights of each support element to swing radially outwardly while the cutting heads pivot radially inwardly into cutting contact with the tubular member and cutting same.

24 Claims, 4 Drawing Sheets

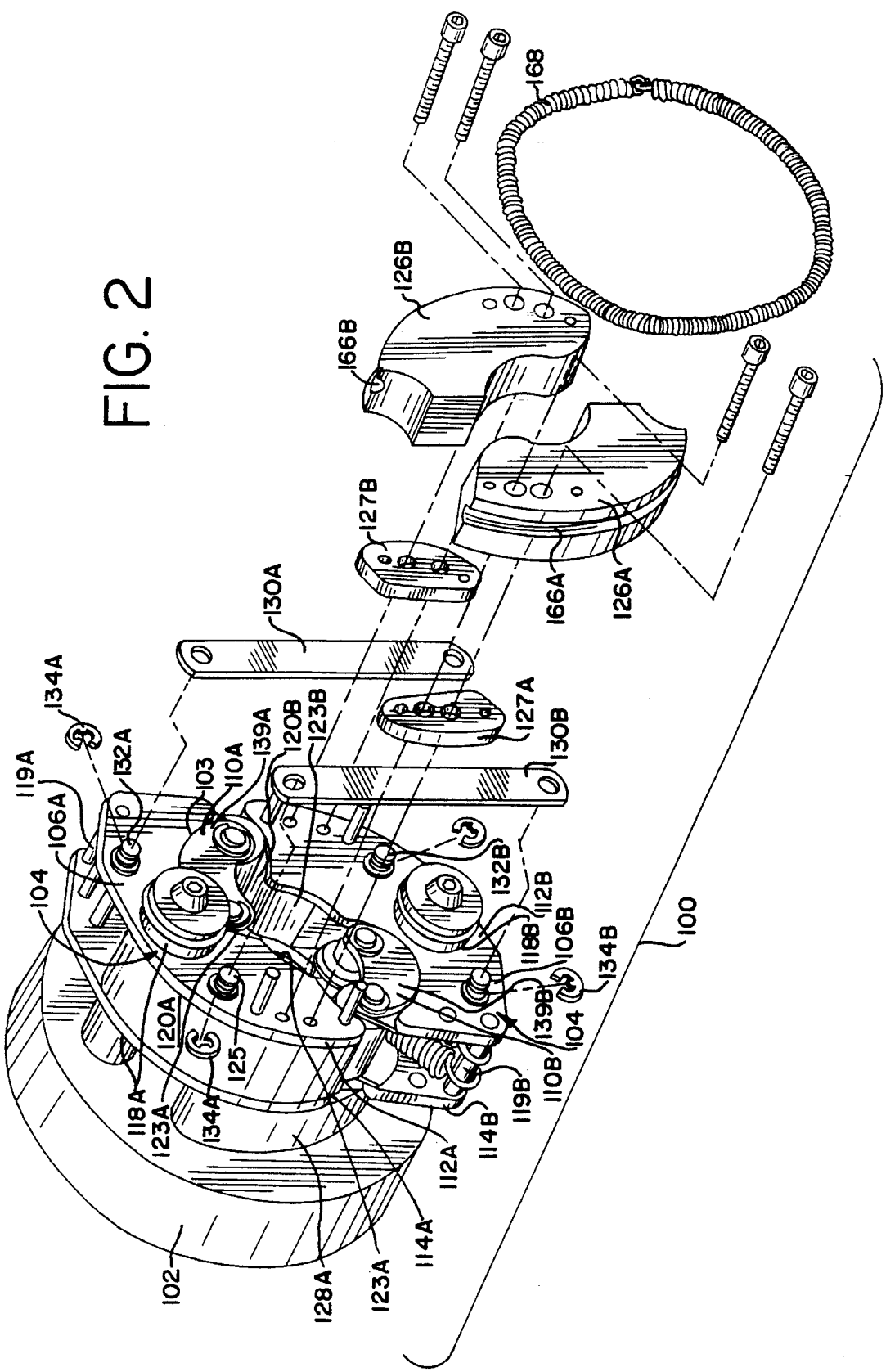

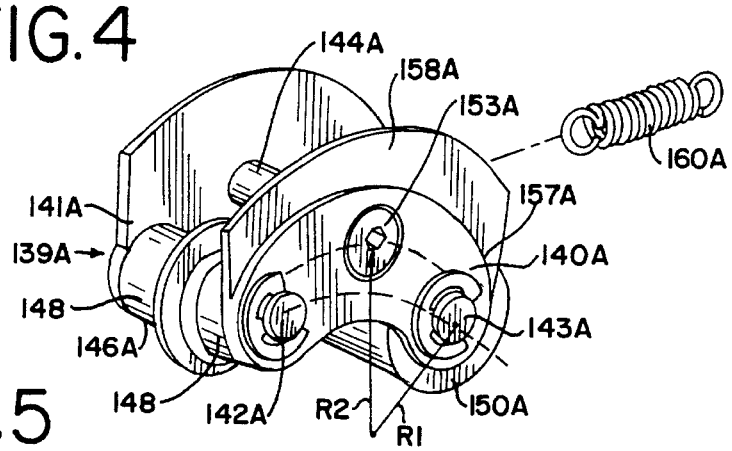
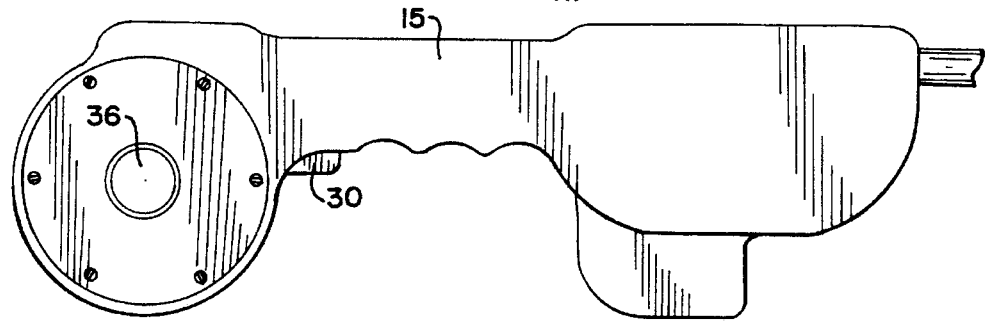
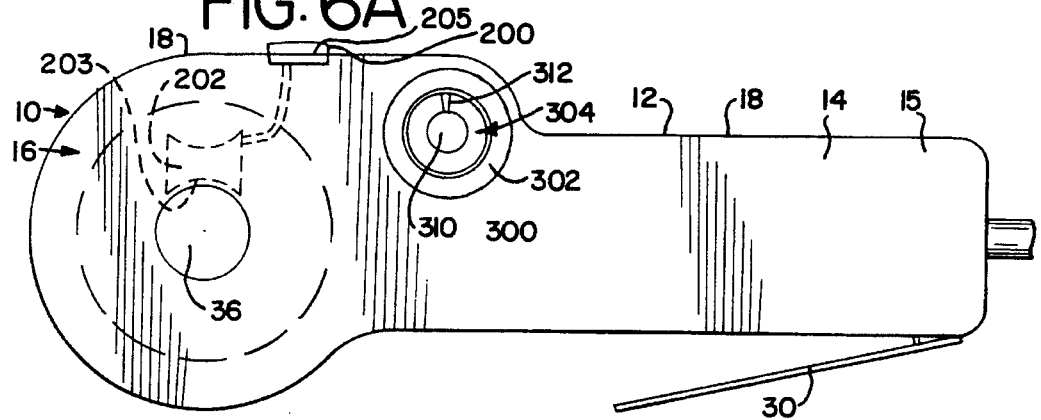
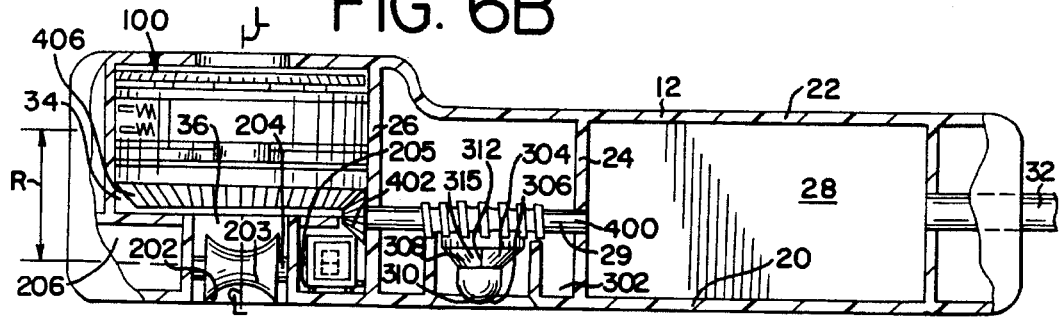

ROTARY CUTTING TOOL FOR TUBING, CONDUIT AND THE LIKE

BACKGROUND AND SUMMARY OF THE INVENTION

The present invention relates generally to handheld cutting tools, and particularly to an improved and reliable handheld tool for reliably cutting lengths of tubing, such as conduit: or the like.

Various types of tubing are widely used in the construction industry. For example, in residential construction, this tubing may typically include copper pipe used to construct water systems and steel conduit used to construct electrical systems. Although in construction, these tubing types are supplied to standard stock lengths, during installation, the tubing must be cut to various different lengths. Hence, an electrician or plumber must make numerous different cuts in a workday during installation.

Known handheld tubing cutters, such as that described in U.S. Pat. No. 5,206,996, issued May 4, 1993, require the user to slip the tool over the tubing length and locate the tool at the precise point where the operator wants to make a cut. The tool is then affixed to the tubing by way of a set screw to retain the cutting tool in place on the tubing length. The tool is then twisted or rotated around the tubing length until the cutting wheel of the tool cuts through the tubing sidewall. Often, the tool may require the operator to manually apply force to the tool such as by squeezing a pair of tool jaws. These manual steps are repeated for every single cut and the steps associated with this style tool not only are monotonous, but also are fatiguing. A fatigued worker may take longer than necessary on a construction project and thus the expense of construction may be increased.

These numerous steps-exemplify one disadvantage of conventional handheld and hand powered cutting tools. Other cutting tools are electrically powered but also have their own particular disadvantages in that they are extremely complex to manufacture, may only be used for one size of tubing, and may not have any self-centering mechanism.

A need therefore exists for a handheld power cutting tool or tubing, conduit or the like which avoids the aforementioned shortcomings. In accordance with an important aspect of the present invention, an improved handheld rotary cutting tool for tubing is provided which includes a rotating cutting assembly having two distinct cutting elements which are mounted on two cutting head assemblies opposite each other around a centerline of an opening in the tool through which the tubing length passes. Each of the cutting head assemblies slidably engages a carrier component rotatably mounted on a base member. Because of the sliding engagement of the cutting carriage and carrier component, the cutting head carriage automatically adjusts itself to the outer diameter of the tubing being cut. Rotation of the base member during operation causes each cutting head assembly to pivot such that a weighted portion thereof swings radially outwardly due to centrifugal force created by the rotation and a cutting portion swings radially inwardly to contact with the exterior surface of the tubing length. As the rotation of the base member continues, the cutting elements cut deeper into the tubing length sidewall. As the rotational speed of the assembly increases, a greater cutting force is exerted on the tubing length.

In another principle aspect of the present invention, each cutting head includes a cutting element carriage in which a cutting element and pressure element, are mounted between two end plates. The centers of the cutting and pressure elements are positioned beneath the center of the cutting head carriage to thereby permit each cutting element to independently center itself within the tool during operation. Each cutting head carriage further slidably engages a carrier member endplate within a recess and is further operatively connected to same by one or more tension springs which assist the cutting carriages along a preselected track of the carriages.

In yet another principle aspect of the present invention, the cutting assembly is mounted within a handheld tool in a body portion thereof. The body portion incorporates a distance measuring means operatively connected to the cutting assembly and is further indexed to the centerline of the cutting assembly so that the measurement means obtains precise lengths of tubing within the tool.

In still another principle aspect of the present invention, the cutting assembly is mounted on a handheld tool body portion which is powered by a drive means. The drive means also drives a deburring roller located in the body portion of the tool. The deburring roller includes a reaming bit having a single radial flute that serves to remove burrs from the tubing cut so that any rough edges remaining on the cut tubing length may be easily removed.

Accordingly, it is therefore a general object of the present invention to provide an improved apparatus for cutting tubular members capable of reliable operation which consistently cut a variety of tubing sizes without an irregular cut.

Another object of the present invention is to provide a cutting assembly for a handheld tool which cuts by way of rotation about a center point of the tool wherein a number of different size tubing lengths can be reliably cut.

Still another object of the present invention is to provide an improved, handheld tubular member cutting tool having a cutting assembly with two cutting heads, each cutting head being mounted on the assembly and adapted for rotation about a center point of the assembly, such that when rotated, portions of the cutting assembly are swung outwardly by centrifugal force such that the cutting elements thereof are brought into contact with the exterior surface of the length of tubing, the cutting elements being mounted in the cutting head beneath the central axis of the cutting head.

Yet another object of the present invention is to provide a handheld apparatus for cutting discrete lengths of tubing or conduit, the apparatus having an opening which receives the tubing or conduit and a cutting assembly which rotates around the opening and which is powered by a drive means located interior of the tool, or interior of the tool body portion, the cutting assembly having multiple cutting heads, each cutting head being disposed opposite anther cutting head and having a cutting element and a roller element, the cutting element contacting the outer surface of the tubing with a cutting wheel portion and the roller element also contacting the outer surface of the tubing, the cutting and pressure elements being slidably mounted on a carrier assembly of the cutting assembly, and further being adapted for movement on a tracking edge of the carrier assembly, the cutting head being the further partially restrained by a biasing means and the cutting and roller elements being disposed in the cutting head generally the center point of the cutting assembly and cutting head.

These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which:

FIG. 2 is an exploded perspective view of the cutting assembly of FIG. 1;

FIG. 4 is a perspective view of the cutting head carriage assembly utilized in the cutting assembly of FIG. 1;

FIG. 5 is an elevational view of a tool incorporating a cutting assembly of the present invention;

FIG. 6A is an elevational view of a handheld tool incorporating the cutting assembly of FIG. 1 in a body portion thereof;

FIG. 6B is a sectional view of the tool of FIG. 6 taken along lines B—B thereof illustrating the relative locations of the cutting mechanism, measuring mechanism, deburring mechanism and driving means for the cutting assembly;

DETAILED DESCRIPTION OF THE PREFERRED EMBODIMENTS

Figure 1:
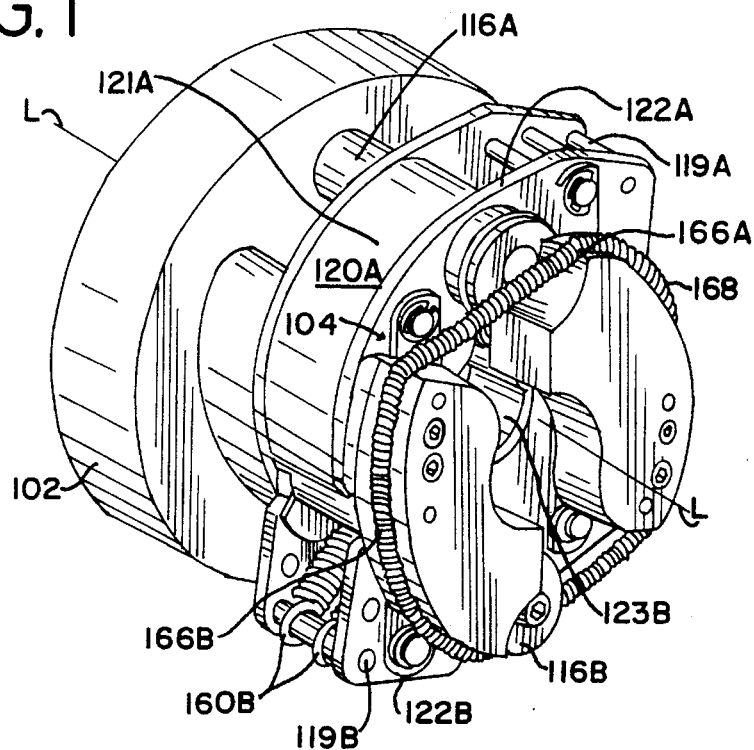
FIG. 1 is a perspective view of a preferred embodiment of a cutting assembly for a handheld tool constructed in accordance with the principles of the present invention.

Referring now the drawings, and in particular FIGS. 6A–B, a preferred embodiment of a handheld cutting tool incorporating the principles of the present invention is illustrated generally as 10 having an elongated housing 12, a handle portion 14 and a working end portion 16. In FIG. 6B, a top sidewall 18 of housing 12 has been cut away to show the other housing sidewalls 20, 22, dividing walls 24, 26 and the internal parts of the tool and cutting mechanism 100. The tool 10 generally contains a cutting mechanism 100, a distance measuring mechanism 200 and a deburring mechanism 300. These three mechanisms 100, 200 and 300 are powered by suitable drive means, such as the electric motor 28 illustrated. The motor 28 may be of a constant or variable speed nature, the variable speed type being preferred. The tool 10 also includes an operating means conveniently disposed in the housing handle portion 14, such as a trigger 30, located proximate to a gripping area 15 on the tool 10. An electrical cable 32 extends away from the handle portion 14 and provides a means for connection to a source of electrical power, to a drive shaft 29 which is suitably coupled to the motor.

Cutting Mechanism

Turning now to the details of the cutting mechanism 100, the front, or working end, 16 of the tool 10 is provided with a cavity, or compartment, 34 which houses the cutting mechanism 100. An opening 36 extends through the front end 16 of the tool 10 and through the cutting mechanism 100 and has a longitudinal axis L which is generally perpendicular to the length of the tool 10. This opening 36 provides a means by which the operator of the tool may insert a tubular member 40, such as a length of conduit, pipe or the like, into the tool for cutting. This opening 36 may be defined primarily by either the tool housing 12 as shown in FIGS. 5, 6A–B or by the cutting mechanism 100 itself.

The tubular member 40 is passed through the tool opening 36 by the operator until it is positioned in the cutting assembly 100 at the desired cut location. This distance is preferably determined by use of the distance measuring means 200, as will be explained below. Once the tubular member 40 is properly located within the tool opening 36, the motor 28 is energized by the operator by depressing the trigger 30.

Figure 3:
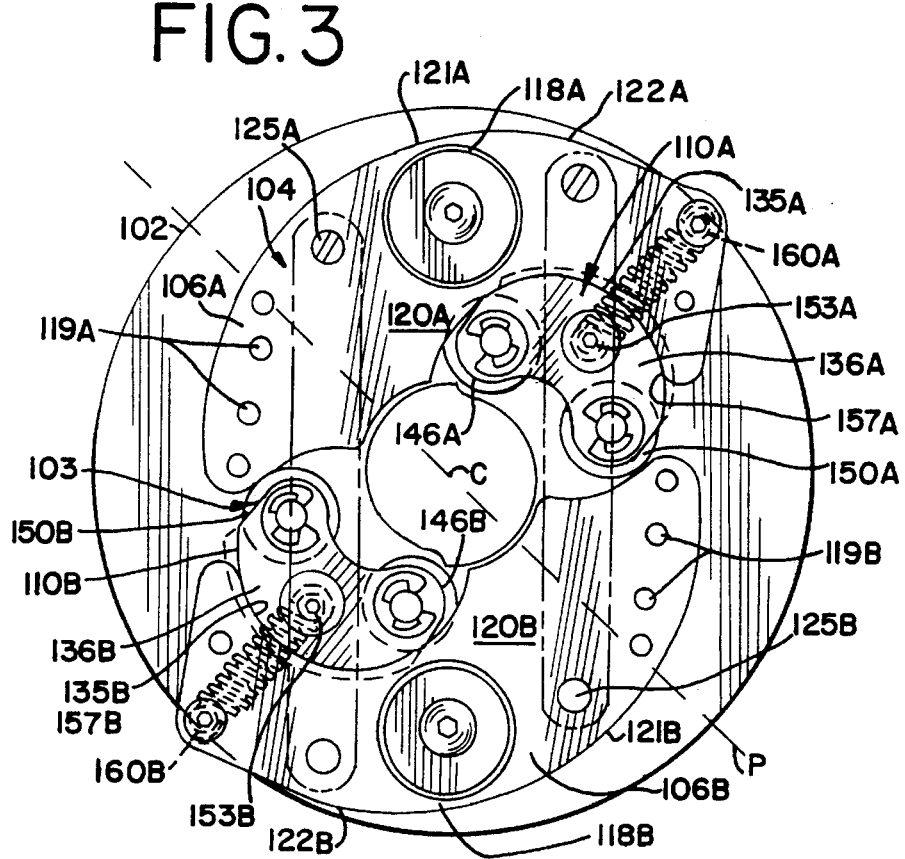
FIG. 3 is a front elevational view of the cutting assembly of FIG. 1 with the return spring and one set of secondary weights removed, illustrating an idle position of the cutting assembly wherein the cutting assembly does not contact the tubular member.

With particular respect to FIGS. 1 & 2, the cutting mechanism 100 includes a base member 102 shown in the form of a disc which holds a carrier, or supporting assembly, 104 in place. The supporting assembly 104 includes two support components 106A–B and a cutting assembly 103 which includes multiple cutting heads 110A–B. The support components 106A–B (and cutting heads 110A–B) are disposed generally opposite each other on the base member 102 and may be considered as separated by an imaginary line P which intersects the axis L (and center C) of the opening 36 (FIG. 3). The support components 106A–B rotatably engage two support posts 116A–B which extend out from the cutting assembly base member 102 in a manner such that the support components 106A–B freely pivot about the support posts 116A–B.

Working from left to right as seen in FIG. 2, each support component 106A–B is seen to comprise an assembly of multiple pieces. Included in this assembly are a pair of primary weights, or masses 120A–B and two spaced-apart endplates 112A–B and 114A–B which enclose the weights 120A–B in place within the components 106A–B. These primary weights 120A–B and endplates 112A–B and 114A–B are held together by a plurality of pins 119A–B. These weights 120A–B provide impetus to the cutting elements of the tool 10 during rotation, as will be explained in greater detail below. The endplates 112A–B and 114A–B each have openings 118A–B which receive the support posts 116A–B in a rotatable manner so that each support component 106A–B may freely pivot about the axis of its respective support post during rotation of the cutting assembly. The primary weights 120A–B may or may not be specially configured to possess curved outer profiles 121A–B which may match the outer edge profiles 122A–B of the endplates as illustrated.

As used in this description, the term "outer" shall refer to the radially outermost member or portion of the cutting assembly with respect to the center C of the tool opening 36 while the term "inner" shall refer to the radial innermost member or portion of the cutting assembly to the center of the tool opening 36. The inner edges 123A–B of the base weights 120A–B may also be similarly curved, and thus provide clearance for movement of the cutting assembly 108 within the supporting assembly 104 during operation of the tool 10. The base weights 120A–B may be secured to the endplates 112A–B, 114A–B as illustrated by end pins 119A–B as well as by the supporting assembly link pins 125A–B. As will be described below, the weights 120A–B provide a means for actuating the cutting elements 146A–B of the cutting heads 110A–B and bringing them into contact with the outer surface of any tubular member 40 present in the tool opening 36 by way of centrifugal forces which are developed in the cutting mechanism 100 by rotation thereof.

Additional, or secondary, weights 126A–B, 128A–B may be secured to the support component endplates 112, 114 on opposing surfaces thereof (illustrated respectively as top and bottom surfaces of the support components in the Figures). The support components 106A–B may also include spacer members 127A–B which space the secondary weights from the surfaces of the endplates 112A–B. These pairs of secondary weights 126A–B, 128A–B preferably share similar shapes, profiles and mass so that the two support components 106A–B are substantially identical. This similarity provides an equilibrium, or dynamic balancing, condition in the cutting mechanism 100, to ensure that the two cutting heads 110A–B are being driven into the tubular member 40 simultaneously during operation of the tool 10. The weight values of the weights may vary with the size of the base member and the cutting force desired in a finished tool.

Slight variations of weight which may occur, however, between the two support components 106A–B due to manufacture tolerances, but will not adversely effect the balance of the supporting assembly 100 and operation of the cutting mechanism 100. Such variations may be compensated by two links 130A–B which, as illustrated, extend between the support components 106A–B. The links 130A–B are preferably disposed generally parallel each other on opposite sides of the tool opening axis L to define a parallelogramatic linkage. These links 130A–B engage pairs of support component pins 125A–B and 132A–B which extend traversely between the support component endplates 112A–B and 114A–B. Suitable connecting means, such as snap rings 134A–B, retain the links 130 in place. Because the links 130A–B preferably engage the support components 106A–B in a generally parallel fashion, any movement which occurs in one support component 106A will induce a like movement in the other support component 106B. Importantly, this linkage 130A–B assists in centering the cutting heads 110A–B in place on the tubular member 40.

In an important aspect of the present invention, the cutting mechanism 100 preferably includes a pair of cutting heads 110A–B which slidably engage the support components 106A–B along a pair of opposing inner engagement surfaces 135A–B defined in the support components 106A–B. These support component inner engagement surfaces 135A–B generally define a curved recess 136A–B which provides a track, or path, in each support component for cutting heads 110A–B to follow during rotation of the cutting mechanism 100. This engagement between the cutting heads 110A–B and their associated support components 106A–B is a sliding engagement and permits the cutting mechanism 100 to have a self-adjusting and self-centering nature to thereby adjust themselves to accommodate various size tubular members 40. The inner profiles of the primary and secondary weights 120A–B and 126A–B, 128A–B preferably match the recess profiles 136A–B so that the weights do not interfere with the movement of the cutting carriages 139A–B along with this track. Each cutting head 110A–B comprises a carriage assembly 139A–B having a cutting element in the form of a wheel 146A–B and an idler roller 150A–B held in place between two opposing endplates 140A–B and 141A–B. The endplates 140A–B, 141A–B are spaced apart by a plurality of pins, or posts, 142A–B, 143A–B and 144A–B.

As illustrated in FIG. 4 and with reference to only one of the two cutting carriages 139 in view of the fact that each cutting head is identical to its complement, one pin 142A of the cutting carriage rotatably supports the cutting wheel 146A in the carriage, while another pin 143A supports the idler roller 150. The cutting wheel 146A–B may include a cutting element integrally formed on the roller or it may be formed as a separate component and mounted on its support pin 142A–B between two adjoining bushings 148A–B. The cutting wheel and pressure roller support pins 142A and 143A are retained in place within the cutting head 110A by snap rings 151A at the ends of the pins. The carriage 139A further preferably includes a support, or retention, post 144A located in the carriage between the cutting and pressure rollers, and further located generally radially outwardly of same as shown in FIG. 4 by the respective reference radii, $R_1$ and $R_2$, illustrated. The support post 144A does not engage a rotating member such as the cutting or pressure roller, and hence they may be somewhat rigidly attached to the carriage endplates 140A, 141A by a machine screws 153A.

The cutting head carriages 139A–B generally have a curved outer profile and, as illustrated, may possess a "kidney" profile when viewed from an end thereof. The outer edges of the carriages 139A–B serve as curved engagement surfaces 157A–B which may or may not define a generally circular arc. These outer engagement surfaces 157A–B of the carriages slidingly engage the opposing, inner engagement surfaces 135A–B of the support components 106A–B. Preferably, the inner engagement surfaces 135A–B of the support components 106A–B are complimentary in their curvature to the outer engagement surfaces 157A–B of the cutting head carriages.

Each carriage engagement surface 157A–B may have a rim, or lip portion, 158A–B associated therewith which extends outwardly therefrom for a preselected extent along the engagement surface periphery. Each rim 158A–B may match the profile of its associated carriage endplate outer engagement surfaces 157A–B or support component inner engagement surfaces 135A–B, or both. This sliding engagement occurs around a central pivot point of the cutting heads is shown in FIG. 4. The cutting heads 110A–B are partially restrained in their sliding movement along this path by an appropriate biasing means, such as multiple springs 160A–B which resiliently interconnect the cutting heads 110A–B with support components 106A–B and ensure that the cutting heads 110A–B consistently engage the support components 106A–B. As illustrated, the springs 160A–B extend between the cutting carriage support pins 144A–B and the support component pins 119A–B. The springs 160 further also assist in adjusting the cutting heads 110A–B to fit the exterior surfaces of different sizes of tubular members 40.

Figure 7:
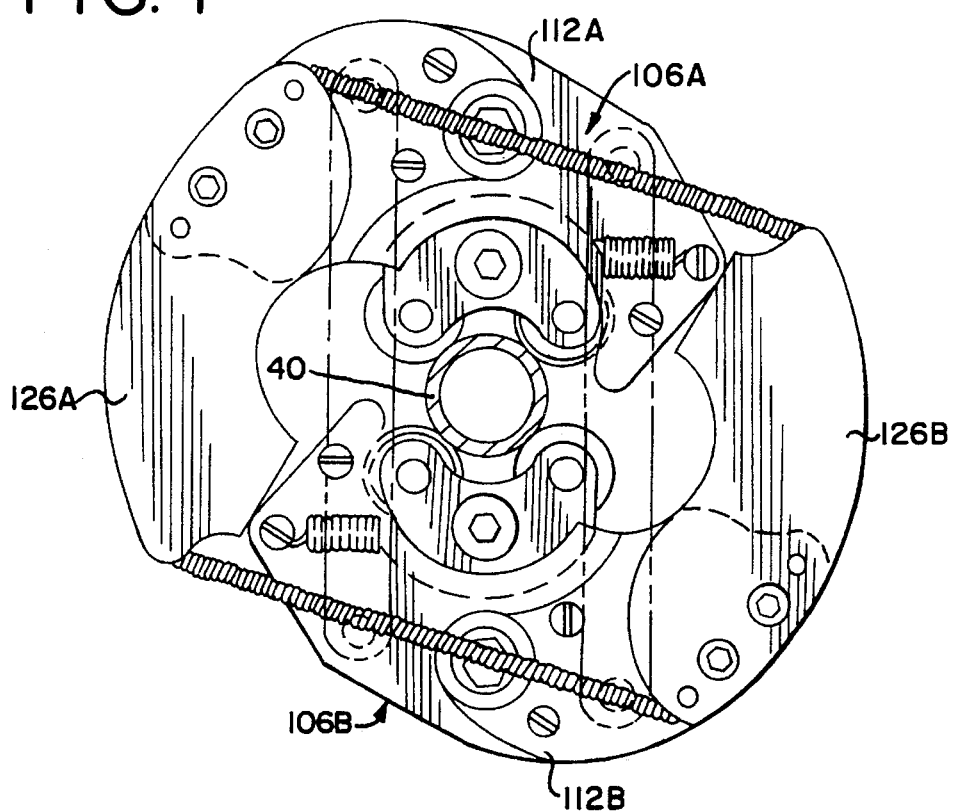
FIG. 7 is a front elevational view of the cutting mechanism of FIG. 1 in a cutting position with the forward support components removed for clarity wherein the cutting heads are in contact with an exterior surface of a tube inserted into the tool opening; and, FIG. 8 is a plan view of another embodiment of a cutting assembly constructed in accordance with the principles of the present invention.

Returning now to FIG. 1, it can be seen that the secondary weights 126A–B, 128A–B are affixed to opposite surfaces of the support components 106A–B and are located on each support component 106A–B radially outwardly of the cutting heads 110A–B. As stated previously, these weights 126A–B, 128A–B may also posses a curved profile which preferably matches the outer profile of the support components 106A–B and provide each support component 106A–B. These secondary weights, as best shown in FIG. 7, span the space which exists between opposing ends of the support components 106A–B and provide each support component 106A–B with a semi-circular weighted outer portion. One set of secondary weights 126A–B may contain grooves 166A–B in their exterior surfaces which receive a return spring 168 which encompasses the two support components 106A–B. The return spring 168 serves to provide a biasing force to the support components 106A–B to normally hold the support components 106A–B in an idle position as illustrated in FIG. 3 and further serves to return the support components 106A–B to such an idle position when the cutting mechanism 100 has completely cut through the tubular member 40.

Figure 8:
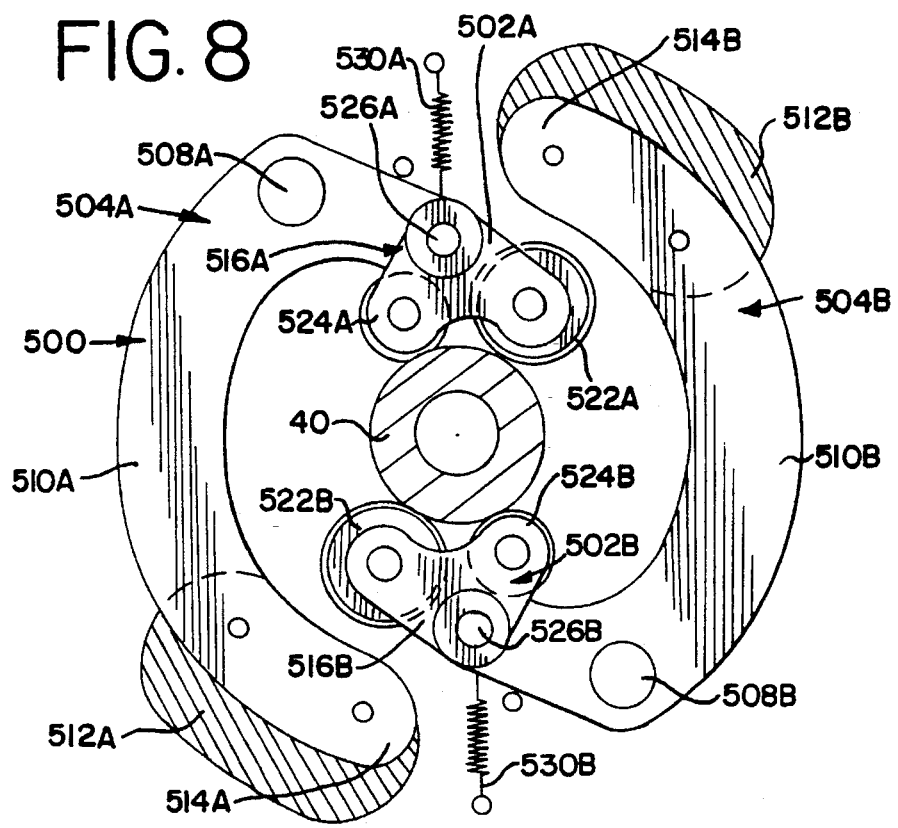

FIG. 8 illustrates another embodiment of a cutting assembly for use in a tool incorporating the principles of the present invention. In this embodiment, the cutting assembly 500 includes two cutting heads 502A–B rotatably mounted on two centrifugal force action components 504A–B. These action components 504A–B are in turn rotatably mounted on a base member 506 at two opposing pivot, or support posts 508A–B. The two centrifugal force components 504A–B include two curved arm members 510A–B which have respective cutting weights 512A–B affixed to their outer end portions 514A–B.

Similar to the embodiment described above, the cutting heads 502A–B each include a carriage 516A–B which engages the arm members 510A–B at their inner ends by way of pivot pins 518A–B. Each carriage includes a cutting roller 520A–B having a radial cutting wheel, or disc, 522A–B, and an idler roller 524A–B which is spaced apart from the cutting roller 520A–B. Each of the rollers are held in place within the carriage 516A–B by suitable support pins 526A–B. The cutting heads each further engage a return spring 530A–B which serves to retract the cutting heads from the center of the tool once the cutting of the tubing member is completed. The cutting assembly 500 may also include one or more stop members 535A–B which project from the base member 506.

Tubing Measurement Mechanism

The present invention also provides a novel measurement mechanism 200 which is operatively associated with the cutting assembly 100, which enables an operator to reliably measure a preselected distance on a tubular member which is intended to be cut with the tool 10. As best illustrated in FIG. 6A and 6B, the tool 10 includes a roller 202 rotatably mounted within the tool housing working end portion 16 in close proximity to the tube opening 36 and suitably powered by the motor drive shaft 29 by way of a gear train or the like. The outer surface 203 of the roller 202 is preferably cylindrical as shown and defines a partial cradle which the tubular member 40 may engage. This outer surface 203 provides a support surface for the tubular member to engage as it is being passed through the tool opening 36 to obtain a precise measurement. The roller 202 is mounted on a shaft 204 which is held between two end walls near the working end of the tool housing 12. The shaft is operatively connected to a suitable distance display means, preferably incorporating a digital display 205 utilizing light-emitting diodes ("LED'S") which are not shown. This display means can obtain its power from either the electric motor 28 when the tool is in operation, or from a storage battery 206 suitably positioned within the tool housing 12. The roller 202 communicates with the display means by way of the shaft 204 and may include a preset distance as its zero point which represents the distance R between the center line of the cutting elements on the cutting heads 110A–B and the centerline of the roller 202. In a manner known in the art, the display means reads the distance of the tubular member 40 as it is being fed through the tube opening 36, by way of the rolling engagement of the roller outer surface 203 with the tubular member 40.

Tubing Deburring Mechanism

A mechanism for removing, or deburring, the rough edges on the tubular member 40 formed as a result of cutting the tubular member is shown generally as 300 in FIGS. 6A & 6B. The deburring mechanism is disposed within a recess 302 formed in the tool body near the front end profile 16 proximate to the compartment 34 which houses the cutting assembly 100. The recess 302 opens to the side of the tool 10 and contains a bit 304 rotatably mounted on a shaft (not shown). The bit 304 is driven during operation of the tool 10 by the tool main drive shaft 400 shown. The source of drive to the mechanism 300 may alternatively include a gear train or drive linkage which supplies driving rotation to the bit 304. The bit 304 has an elongated head portion 306 which extends through the recess from a conical base portion 308. The head portion 306 is generally cylindrical in nature and may include, as illustrated, a rounded end portion 310. The head portion 306 is preferably wide enough to substantially close off the open area in the recess 302 to thereby reduce the likelihood of the operator (or another) inadvertently inserting a fingertip into the deburring mechanism 300 and injuring themselves. The conical base portion 308 includes a radially extending vertical single flute 312 having a contact edge 315 which bears against the end of the tubing length inserted therein.

In operation, after the tubular member 40 is cut to the desired length, the operator then inserts the rough end of the tubular member into the recess 302. The rounded end profile 310 of the head 306 assists the operator in centering the tubular member 40 within the recess 302 and onto the deburring mechanism 300. The trigger 30 is depressed to provide drive to the bit 304 and the tubing length 40 is pressed further into the recess until it contacts the cutting edge 314, where it is held in place until a desired surface is obtained on the end of the tubing length.

Tool Drive Mechanism

The tool 10 includes a mechanism to supply drive to the cutting assembly 100 which includes the electric motor 28 and an associated drive shaft 29. The shaft of the motor 28 may be utilized solely as the drive shaft 29, or a shaft extension member may be coupled to the drive shaft 29 to drivingly engage the other powered mechanisms of the tool 10. A drive gear, such as the pinion gear 402 may contact with the drive shaft 29 and engage the cutting assembly base member 102 at an engagement surface 404 thereof. This base member engagement surface may, include as illustrated, a bevel driven gear 406, or it may include any other suitable driven structure, such as, for example a ring gear or worm and spur gear. The engagement surface may be formed in the base member 102 illustrated or it may be formed on a separate member positioned adjacent the base member 102.

Operation of the Tool

In operation, a tubular member 40 is inserted into the opening 36 into contact with the distance indicating means roller 202. The tubing 40 is advanced through the opening 36 until the distance indicator 205 displays the preselected distance and the cutting heads 110A–B are positioned in a ready position. As the trigger 30 is depressed by the operator, the motor 28 supplies drive to the drive shaft 400 and the drive pinion gear 402 rotates. The pinion gear 402 engages the cutting assembly ring gear 406 which rotates the base member 102 of the cutting assembly 100. As it rotates, the cutting assembly moves from the idle position illustrated in FIG. 3 to the cutting position illustrated in FIG. 7 where the cutting heads 110A–B contact the exterior surface of the tubing 40.

As a result of rotation of the base member 102, the two components 106A–B pivot around the support posts 116A–B in the same direction as rotation of the base member 102. For example, if the base member 102 is rotated clockwise about the center C of the opening 36, the support components 106A–B likewise rotate clockwise around their support posts 116A–B. The supports posts 116A–B serve as fulcrums for the support components 106A–B so that the weights 120A–B, 126A–B and 128A–B thereof swing outwardly. Because of the rotation of the base member 102, centrifugal force develops in the cutting mechanism 100 which swings the weights outwardly. This centrifugal force increases as the rotational speed increases and, as the weights at the tool opening seek an outermost position with respect to the center C, the cutting heads 110A–B and cutting elements 146A–B thereof are pressed deeper into the tubing surface. Both cutting elements 146A–B ride in the same groove in the outer surface of the tubing 40 and exert a balanced cutting force on the tubular member 40.

The time for a complete cut to be made is dependent on the rotational speed of the tool 10. When a variable speed motor is used, the operator may choose a variety of speeds at which to cut the tubing. Due to the arrangement of the support assemblies and cutting heads, the tool gives reliable and consistent cutting of a variety of different sizes of tubing and clean cutting results. Three conditions affect the cutting performance of the tool 10: The radial distance at which the weights are positioned from the center C of the tool, the mass of the weights and the speed at which the cutting assembly is operated. For example, while using a variable speed motor, the present invention has cut 0.75 inch diameter copper piping in approximately 7 seconds with the cutting mechanism rotating at 40 RPM. By increasing the speed of the cutting mechanism to 1000 RPM, the cutting time on the same pipe was reduced to under approximately 3½ seconds.

While the preferred embodiments of the invention have been shown and described, it will be apparent to those skilled in the art that changes and modifications may be made therein without departing from the spirit of the invention, the scope of which is defined by the appended claims.

I claim:

1. A tool for cutting lengths of tubing and cylindrical objects, the tool comprising: a body portion defining an opening of said tool through a first end of said tool to accommodate a tubing length therein, a cutting assembly, a motor for supplying drive to the cutting assembly, said cutting assembly including a base member and two support assemblies pivotally mounted on the base member, at least two cutting heads in engagement with the two support assemblies, one of said two cutting heads being operatively associated with one support assembly and the other of said two cutting heads being operatively associated with the other of said two support assemblies, each support assembly engaging a pivot post disposed on opposing sides of a line taken through a center of said tool opening, each of said support assemblies including a weighted portion disposed radially outwardly with respect to its associated cutting head, each of said cutting heads including a carriage having a cutting roller and a pressure roller, said cutting heads slidably engaging said support assemblies inwardly of said support assembly weighted portions and the cutting head carriages including means for retaining said cutting heads in engagement with said support assemblies, whereby when said motor supplies drive to said cutting assembly, said support assemblies rotate around said tool opening and said weighted portions of said support assemblies swing outwardly due to centrifugal force, thereby causing said cutting heads to move radially inwardly and contact an exterior surface of said tubing, said cutting heads adjusting to said tubing member exterior surface by sliding along said support assemblies.

2. The tool of claim 1, wherein the centers of said cutting and pressure rollers of said cutting head carriages are located radially inwardly of the centers of said carriages.

3. The tool of claim 2, wherein each cutting head carriage includes a support member and said cutting head engagement retaining means includes at least one spring engaging said support assembly and said cutting head carriage support member.

4. The tool of claim 1, further including means for returning said cutting heads to a position wherein said cutting heads do not contact said tubing member, said cutting head return means including a spring engaging each of said support assemblies, each of said cutting heads including a cutting wheel and an idler wheel, said springs engaging said support assemblies at a location radially outwardly of said cutting and idler wheels.

5. The tool of claim 1, wherein said support assemblies are operatively interconnected by at least two linkage members which define a parallel linkage.

6. The tool of claim 1, further including means for deburring an end of a tubing member, the deburring means including a rotatable bit mounted in a recess defined in said tool body portion, the bit having a cylindrical body portion which occupies a substantial portion of said recess to reduce the likelihood of injury to an operator, said bit being driven by said motor.

7. The tool of claim 1, further including means for measuring the length of a section of said tubing member, the length measuring means including a roller member disposed proximate to said tool opening such that it contacts an outer surface of said tubing member passing through said tool opening, said roller member being operatively connected to a visual display means, the visual display means displaying the length of said tubing as measured by said roller member.

8. The tool of claim 1, wherein said base member includes an engagement surface which engages a pinion gear of said motor.

9. The tool of claim 1, wherein each of said support assemblies includes a inner curved engagement surface and each of said cutting heads includes an outer curved engagement surface, said cutting head carriages being maintained in contact with said supporting assemblies along said respective outer and inner engagement surfaces thereof by at least one retention spring.

10. The tool of claim 9, wherein each of said cutting head carriages includes a projecting rim defined on an outer surface thereof, the rim slidingly engaging said inner engagement surfaces of said support assembly.

11. The tool of claim 1, wherein said support assembly weighted portions include a plurality of weights.

12. The tool of claim 1, wherein each of said cutting heads includes a radial outer engagement surface and each of said support assemblies includes a radial inner engagement surface, said cutting head outer engagement surfaces opposing said support assembly inner engagement surfaces, said support assembly engagement surfaces each defining a track along which a cutting head moves in response to movement of said support assemblies during operation of said tool to conform to an exterior surface of said tubing length.

13. A tool for cutting tubular members, comprising;

a tool body portion having a first end;

a cutting assembly mounted within said tool body portion first end, the cutting assembly defining an opening of said tool, the cutting assembly being adapted for rotation around said tool opening, said cutting assembly including two centrifugal force inducing coponents rotatably mounted on said cutting assembly radially outwardly of said tool opening, one of said two centrifugal force inducing components being rotatable around a first axis of said tool and the other of said two centrifugal force inducing components being rotatable around a second axis of said tool;

said cutting assembly further including two cutting heads, each of the two cutting heads engaging a single centrifugal force inducing component at a location in said cutting assembly which is radially inwardly of said tool first and second axes, each of said two cutting heads comprising a cutting head carriage, each cutting head carriage having a cutting roller with a cutting disc and a pressure roller, said cutting and pressure rollers being rotatably mounted within said cutting head carriages adjacent each other and radially inwardly with respect to the point of engagement between said cutting heads and said force-inducing components;

a motor disposed in said tool body portion for supplying rotational drive to said cutting assembly, whereby, when rotational drive is supplied to said cutting assembly and said cutting assembly rotates around said tool opening, said centrifugal force inducing components swing radially outwardly around said tool first and second axes, thereby causing said two cutting heads to swing radially inwardly into said tool opening and into contact with an exterior surface of a wall of a tubular member inserted into said tool opening.

14. The cutting tool of claim 13, wherein said cutting head carriages rotatably engage said centrifugal force inducing components.

15. The cutting tool of claim 13, wherein said cutting head carriages slidingly engage said centrifugal force inducing components.

16. The cutting tool of claim 13, wherein each of said centrifugal force inducing components includes at least one weighted portion disposed radially outwardly of said cutting heads.

17. The cutting tool of claim 13, wherein each of said centrifugal force inducing components includes an arcuate cutting head engagement surface, and each of said cutting heads include an arcuate centrifugal force inducing component engagement surface, said cutting heads slidingly engaging said centrifugal force inducing components along said respective engagement surfaces.

18. The cutting tool of claim 17, wherein each of said cutting head carriages further includes a rim extending along a portion of said cutting head engagement surface, said rim engaging a surface of said centrifugal force-inducing component when said centrifugal force inducing component and cutting head engagement surfaces abut each other.

19. The cutting tool of claim 13, wherein said cutting assembly includes a linkage interconnecting said two centrifugal force inducing components whereby movement of one of said two centrifugal force inducing components in said cutting assembly induces a like movement in said other of said two centrifugal force inducing components.

20. The cutting tool of claim 13, wherein each of said centrifugal force including components includes an interior recess portion and said two cutting heads respectively slidably engage said recess portions such that movement of said centrifugal force including components induces a sliding movement of said cutting heads within said recess portions.

21. In a tool for cutting tubular members wherein the tool includes a working end portion and a drive motor, the improvement comprising: a cutting assembly adapted for mounting on said tool and receiving drive from said tool motor; the cutting assembly having an opening defined therein adapted to receive a tubular member therein, said cutting assembly including at least two cutting means disposed on said cutting assembly on opposite sides of a reference line drawn through a center of said tool opening, each of said cutting means including a cutting carriage having a cutting roller and an idler roller mounted generally adjacent each other on said carriage, said cutting assembly further including at least two support arm members, each of said support arm members pivotally engaging a base member and each of said support arm members engaging an associated cutting carriage, each of said support arm members further including at least one weight disposed radially outwardly on said support arm member with respect to said associated cutting carriage, whereby when said cutting assembly is rotated around said tool opening center, centrifugal force developed by said support arm member weights causes each of said support arm members to rotate about their pivot points to force said cutting carriages radially inwardly toward said tool opening center and into contact with a tubular member inserted into said opening, each of said cutting carriages having an outer curved engagement surface which slidingly engages an inner curved engagement surface of said support arm members, each of said support arm members further including means retaining an associated cutting carriage in contact with said support arm member.

22. The cutting assembly of claim 21, further including spring means for biasing said cutting carriages out of contact with said tubular member when rotation of said cutting assembly stops.

23. The cutting assembly of claim 21, wherein each of said cutting carriages includes a post member, the axis of said post member being disposed radially outwardly of said cutting and idler rollers with respect to said center of said tool opening.

24. The cutting assembly of claim 23, wherein each of said cutting carriages include a projecting lip portion associated with said cutting carriage outer curved engagement surfaces, each of said lip portions contacting said support arm members.

* * * * *